US005842665A

United States Patent [19]
McKinney et al.

[11] Patent Number: 5,842,665
[45] Date of Patent: Dec. 1, 1998

[54] LAUNCH VEHICLE WITH ENGINE MOUNTED ON A ROTOR

[75] Inventors: Bevin C. McKinney, Gig Harbor, Wash.; Gary C. Hudson, Redwood City, Calif.

[73] Assignee: HMX, Inc., Reno, Nev.

[21] Appl. No.: 711,964

[22] Filed: Sep. 9, 1996

[51] Int. Cl.$^6$ .................................................. B64C 39/00
[52] U.S. Cl. ............................ 244/2; 244/7 A; 244/158 R
[58] Field of Search .......................... 244/2, 7 A, 158 R, 244/17.25, 17.27; 416/20 R, 21

[56] References Cited

U.S. PATENT DOCUMENTS

| | | | |
|---|---|---|---|
| 2,479,125 | 8/1949 | Leonard | 416/20 |
| 2,585,468 | 2/1952 | Isacco | 244/17.11 |
| 2,684,213 | 7/1954 | Robert et al. | 244/8 |
| 2,745,498 | 5/1956 | Nagler | 170/135.4 |
| 2,763,447 | 9/1956 | Carrau | 244/2 |
| 2,843,337 | 7/1958 | Bennett | 244/2 |
| 2,862,680 | 12/1958 | Berger | 244/17.17 |
| 2,959,376 | 11/1960 | Saurma | 244/14 |
| 3,010,678 | 11/1961 | Gose | 244/17.11 |
| 3,116,036 | 12/1963 | Nichols | 244/7 A |
| 3,159,360 | 12/1964 | Ryan et al. | 244/7 A |
| 3,181,824 | 5/1965 | Anania | 244/138 |
| 3,210,025 | 10/1965 | Lubben et al. | 244/1 |
| 3,558,080 | 1/1971 | Kretz | 244/17.11 |
| 4,296,892 | 10/1981 | Barge | 244/2 |
| 4,589,611 | 5/1986 | Ramme et al. | 416/20 R |
| 5,058,833 | 10/1991 | Carmouche | 244/158 |

FOREIGN PATENT DOCUMENTS

| | | |
|---|---|---|
| 1430178 | 5/1966 | France . |
| 748540 | 5/1956 | United Kingdom ................... 244/7 A |

OTHER PUBLICATIONS

G. Hudson, *Roton: An Orbital Helicopter*, Spacefaring Gazette, Feb./Mar. 1994 at 1, 7.

*The Roton Landing System Concept for Spacecraft and Other Possible Applications of Rotors on Spacecraft*, Bell Helicopter Corporation, Jun. 194.

A. Sergienko, Document N. 1AF–91–260, *Liquid Rocket Engines for Large Thrust: Present and Future*, meeting materials of the 42nd Congress of the International Astronautical Federation, Oct. 5–11, 1991, Montreal, Canada.

(List continued on next page.)

*Primary Examiner*—Mark T. Le
*Assistant Examiner*—Tien Dinh
*Attorney, Agent, or Firm*—Lathrop & Clark

[57] ABSTRACT

A launch vehicle which employs a rotor similar to a helicopter. The vehicle has a four bladed rotor which is mounted on the vehicle body. The body of the vehicle includes propellant tanks and a payload compartment contained within an integral aeroshell. Rocket engines used to propel the vehicle into earth orbit are mounted at the ends of the rotor blades. The engines are connected by propellant feed lines to a propellant transfer hub surrounding the axis of rotation of the rotor. Propellants are fed from an oxidizer tank and a fuel tank through a propellant transfer coupling to oxidizer and fuel lines which extend to the engines at the rotor blades ends. The rotor blades incorporate air foils. To operate the vehicle the vehicle is positioned on a concrete or asphalt pad and fueled with liquid oxygen and kerosene. The engine are positioned tangent to the blade paths and ignited. The thrust of the engines which is tangent to the rotor causes the rotor to turn which accelerates the rotor thus increasing the pressure developed by the propellants as they flow towards the engines. When the rotor has reached operational speed the airfoil creates sufficient lift that the vehicle begins to ascend vertically. As the vehicle exits the atmosphere the rocket engines are aligned with the flight path of the vehicle. After reentry from earth orbit the vehicle utilizes the spun up rotor to fly the vehicle to a soft landing.

15 Claims, 13 Drawing Sheets

OTHER PUBLICATIONS

J. Whitehead, Document No. AIAA 96–3108, *Single Stage to Orbit Mass Budgets Derived from Propellant Density and Specific Impulse,* meeting materials of the 32nd AIAA/ASME/SAE/ASEE Joint Propulsion Conference, Jul. 1–3, 1996, Lake Buena Vista, Florida.

M. Kretz, et al., Document No. 670391, *Space Rotor—A French Concept for a Reusable Recovery System,* pp. 175–182.

J. Barzda, *Rotors for Recovery,* J. Spacecraft, vol. 3, No. 1, Jan. 1996.

Focke–Wulf Triebflügel, 1 page.

C. R. Haig, Document No. 8008–099–001, *An Aerodynamic Analysis of a Lifting Rotor in Hypersonic Flight,* Bell Helicopter Corporation, Jun. 19, 1959.

R. C. Smith, et al., Document No. 68–969, *The Unpowered Rotor: A Lifting Decelerator for Spacecraft Recovery,* meeting materials of the AIAA 2nd Aerodynamic Deceleration Systems.

A. D. Levin, et al., *Experimental Aerodynamics of a Rotor Entry Vehicle,* J. Aircraft, vol. 8, No. 4, pp. 330–335.

R. C. Smith, et al., Document No. D–4065, *Heat–Transfer Measurements on the Rotor Blade of a Rotor Entry Vehicle Model,* 1967, National Aeronautics and Space Administration (NASA) library, Ames Research Center, Moffett Field, California.

A. D. Levine, et al., Document D–4537, *An Analytical Investigation of the Aerodynamic and Performance Characteristics of an Unpowered Rotor Entry Vehicle,* 1968, National Aeronautics and Space Administration (NASA) library, Washington, D.C.

LAUNCH VEHICLE WITH ENGINE MOUNTED ON A ROTOR

FIELD OF THE INVENTION

The present invention relates to launch vehicles and rocket propelled vehicles in general and to reusable rocket propelled vehicles in particular.

BACKGROUND OF THE INVENTION

Reusable launch vehicles and antipodal rocket transports face three general problems which have hindered their development. The first problem is the need for expensive vehicle specific launch and recovery facilities. A typical facility for the Space Shuttle such as the one constructed at Vandenberg Air Force Base cost over 2.8 billion dollars. The cost for facilities for the launch of even expendable launch vehicles often can exceed $100 million for a single pad and associated support facilities.

The second problem relates to the complexity and cost of a high performance rocket engine. High performance in rocket engines requires high chamber pressures. This requires turbine driven pumps which have power to weight ratios which exceed that of jet engines. The extremely high power density leads not only to high cost but short life. Rocket engines have life times measured in minutes to hours whereas jet engines have life times measured in hundreds of hours to tens of thousands of hours. Existing high pressure rocket engines utilize turbines which must generate the required power to drive the pumps by converting a high pressure flow of gases generated by the propellants into rotative energy.

The third problem is a recovery system which is highly reliable and very light weight. Using rocket thrust to land a reusable vehicle has been demonstrated by the DC-X built by McDonnell Douglas Inc. However, the difficult problem of reliably restarting rocket engines for landing has not been demonstrated. The fuel necessary for a rocket landing also adds weight and requires on-orbit storage of additional cryogenic propellants. Winged landing adds weight to the vehicle and requires long runways—which contributes to the facilities problem.

A fourth problem has generally led to the design of reusable launch vehicles of relatively large size. Aerodynamic drag losses for a small vehicles may exceed 2,000 feet per second, whereas for a sufficiently large vehicle aerodynamic drag can be less than 200 feet per second. Because single stage vehicles—which have many operational advantages—are particularly sensitive to total velocity required to reach orbit, small vehicles with payloads of one or two tons, which might alleviate some of the cost concern of large facilities and expensive engines, have not been seriously considered.

As early as the late 1940s, rocket engines were built which used the centrifugal pumping power of a rotary arrangement to provide the energy to force propellants into the combustion chamber. The "cyclo-rocket" developed at Aerojet in 1946 was the first to employ this approach, though it did not use the actual centrifugal forces produced by spinning the rocket around in a circle to provide direct pumping power; rather it converted the rotary engine motion into shaft power to run a centrifugal pump. (Hero's steam engine is a simple expression of one element of this concept.) Mounting the engines at the perimeter of a spinning rotor was described in a Russian paper presented at the 1991 Congress of the International Astronautical Federation: Sergienko, A. "Liquid Rocket Engines for Large Thrust: Present and Future" 42nd Congress of the International Astronautical Federation, Oct. 5–11 1991.

What is needed is a launch vehicle capable of operating from minimal ground facilities. The vehicle should also incorporate a reliable lightweight recovery system and be capable of achieving high engine performance without costly turbomachinery.

SUMMARY OF THE INVENTION

The launch vehicle of this invention employs a rotor similar to a helicopter. The vehicle has a four bladed rotor, mounted on the vehicle body. The body of the vehicle includes propellant tanks and a payload compartment contained within an integral aeroshell. Rocket engines used to propel the vehicle into earth orbit are mounted at the ends of the rotor blades. The engines are connected by propellant feed lines to a propellant transfer hub surrounding the axis of rotation of the rotor. Propellants are fed from an oxidizer tank and a fuel tank through a propellant transfer coupling to oxidizer and fuel lines which extend to the engines at the rotor blade ends.

The rotor axis of rotation defines a direction along which the vehicle is accelerated. The rotor blades have air foils similar to those of a helicopter or propeller blade. The engines are mounted to the rotor at the outer ends of the blades. The blades and the engines pivot so as to be movable between a position where there thrust axis engine is substantially aligned with the axis of rotation of the rotor and a position where the thrust axis of the engine lies in a plane defined by the rotation of the rotor and is tangent to and aligned with the path of the rotor. When the engines are tangent to the path of the rotor, the blades are configured for maximal lift. When the engines are aligned with the axis of rotational of the rotor the blades are feathered so as to substantially reduce their drag.

Rotation of the rotor causes propellant to be accelerated by centrifugal force and thus flow with ever increasing pressure from the fluid coupling to the rocket engine at the rotor ends. The rotor is caused to rotate because at least a component of the engine's thrust is tangent to the blades thus driving the blade to rotate. The motion of the rotor also can be used to produce aerodynamic lift. The rotation of the airfoils generates lift when the airfoils are properly oriented with respect to the path of the rotor.

The launch vehicle achieves improved operability, improved performance and low cost by utilizing a rotor to provide aerodynamnic lift and to raise the propellants to high static pressures necessary to operate the engines at high pressures. High pressure engines deliver improved engine performance compared to engines of lower pressure.

To operate the vehicle the vehicle is positioned onto a concrete or asphalt pad and fueled with liquid oxygen (The oxidizer) and kerosene. The engines are positioned tangent to the blade paths and ignited. Initially propellants flow to the engines under tank pressure. Or the rotor may be spun up by a starting cart using compressed air or an electric motor. The thrust of the engines—which is tangent to the rotor—causes the rotor to turn which accelerates the rotor thus increasing the pressure developed by the propellants as they flow towards the engines. For takeoff using aerodynamic forces generated by the airfoil, full engine thrust is not required and throttling of the propellant flow is used to control the thrust to about twenty percent of the vehicle's weight. When the rotor has reached operational speed the airfoil creates sufficient lift that the vehicle begins to ascend vertically. Because the engines fire in the plane of the rotor they thrust parallel to the ground. This together with the low thrust level allows the vehicle to operate without a flame deflector or pad structure. The blades are operated such that the tip velocity is at high subsonic velocities, or about 950 ft/sec. As the vehicle ascends the engines are pitched downwardly, thrust is increased, and only a component of the engine's thrust causes the rotor to turn. As the vehicle ascends the pitch of the air foil is continuously increased to optimize the trajectory. After the vehicle leaves the atmospheric at about 120,000 feet the pitch of the airfoil is positioned to minimize drag and heating, as the vehicle continues on to orbit under rocket power.

The vehicle reenters the atmosphere from orbit by restarting the engines and slowing the vehicle down so the orbital path of the vehicle intersects the earth's atmosphere. When the vehicle enters the earth's atmosphere aerodynamic drag slows the vehicle down. As the vehicle approaches the landing site the aerodynamic forces of the air moving by the vehicle as it falls towards the earth's surface can be used to spin up the rotor which can then fly the vehicle to a soft landing. This is similar to how a helicopter lands without power. The engines may be restarted to provide additional loiter time over the landing site.

It is an object of the present invention to provide a launch vehicle which has high pressure engines without high speed turbo machinery.

It is another object of the present invention to provide a launch vehicle which can be launched without a pad or flame deflector.

It is a further object of the present invention to provide a launch vehicle which has improved performance provided by air augmentation of the thrust provided by the vehicles rocket engines.

It is yet another object of the present invention to provide a launch vehicle with reduced noise during takeoff.

It is a still further object of the present invention to provide a launch vehicle which is recovered from orbit to a soft landing with an aerodynamic rotor.

It is an yet further object of the present invention to provide a launch vehicle with reduced reentry deceleration and heating.

It is also an object of the present invention to provide a launch vehicle with significant cross range during reentry.

It is an additional object of the present invention to provide a ballistic transport.

Further objects, features and advantages of the invention will be apparent from the following detailed description when taken in conjunction with the accompanying drawings.

DESCRIPTION OF THE PREFERRED EMBODIMENT

Figure 1:
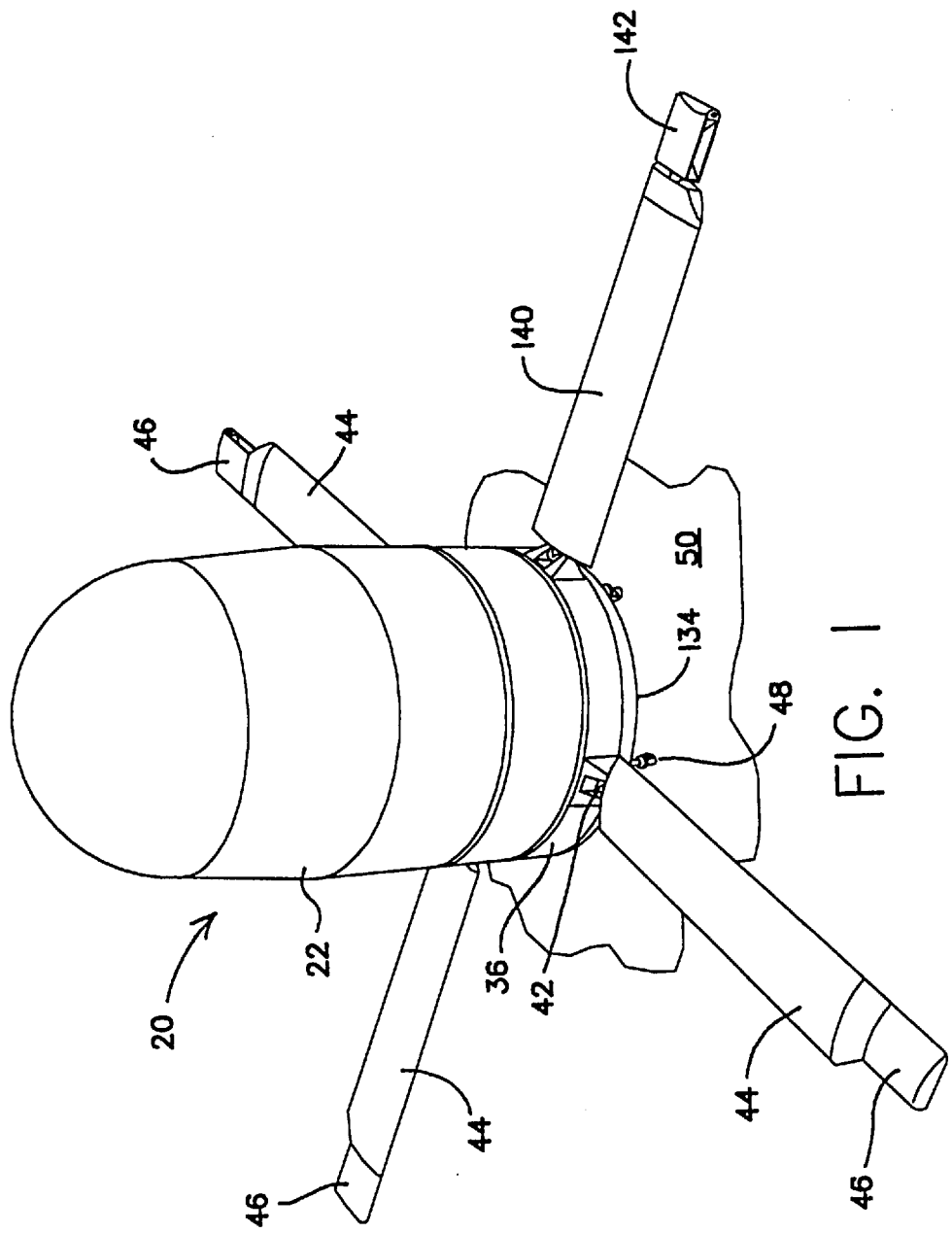
FIG. 1 is a perspective view of the launch vehicle of this invention.

Referring more particularly to FIGS. 1–12 wherein like numbers refer to similar parts, a launch vehicle 20 is shown in FIG. 1. The vehicle 20 has an integrated aeroshell 22 which is divided by a lower bulkhead 24, a common bulkhead 26, and an upper bulkhead 28 into a fuel tank 30, an oxidizer tank 32, and a payload bay 34. A rotor 36 is mounted by a bearing 38 which is gimballed by a gimbal mount 40 to the aeroshell 22. The bearing 38 and gimbal mount 40 are shown in enlarged detail in FIG. 6. The rotor 36 has four arms 42 which extend radially from the rotor. Each arm supports a blade 44 and a tip mounted rocket engine 46. The rocket engines 46 are fixedly mounted with respect to the blades 44. The blades 44 and rocket engines 46 are pivotally mounted to the rotor 36 on the arms 42. The vehicle 20 has landing gear 48 which is mounted beneath the rotor 36 and can be retracted for flight or extended for landing and launch.

Figure 3:
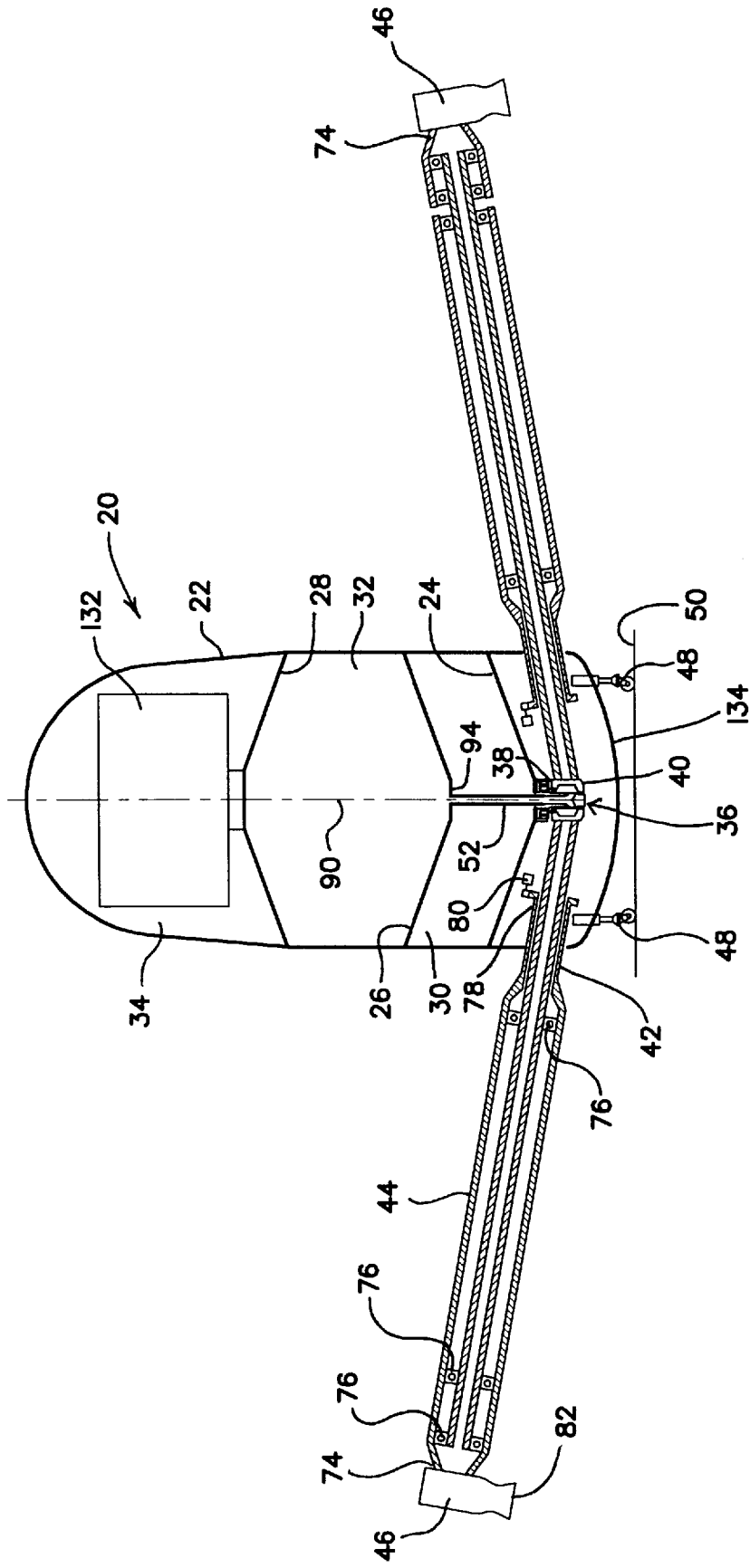
FIG. 3 is a cross-sectional view of the vehicle of FIG. 1.

For operation the vehicle 20 is positioned as shown in FIGS. 1 and 3 on an asphalt or concrete apron 50. Liquid oxygen from the oxidizer tank 32 flows down a standpipe 52 under tank pressure. The liquid oxygen, shown by arrows 54, is diverted into a volute 56 by a splash plate 58. The splash plate 58 diverts the flow ninety degrees into the volute 56. An outlet 60 which is rotating with the rotor 36 allows the liquid oxygen to drain into supply lines 63 and travels down each rotor arm 42 and supplies liquid oxygen to the rocket engines 46. In a similar manner fuel, typically kerosene or one of the higher density jet fuels such as JP-5 or JP-7, follows a path indicated by arrows 64 to a fuel volute 66. The fuel than flows across the rotating joint 68.

The fuel, which is now rotating with the rotor 36, drains down fuel supply lines 72 in each of the rotor arms 42. As the fuel and oxidizer flow down the arms 42 centrifugal acceleration causes an increase in fuel and oxidizer pressure to about 4,000 to 6,000 psi depending on rotor tip velocity, rotor length, and propellant densities. Propellant pressure is proportional to tip speed. Regardless of rotor diameter, if the tip speed is the same, the pressure will be the same. The equation is:

$$\text{Pressure (psi)} = \text{tip speed (ft/sec)}^2 \times \text{liquid density (lb/ft}^3\text{)}/(288 \times g)$$

Where g=32.2 ft/sec-sec

The rotor 36 is about sixty feet in diameter and rotates at a velocity of just less than sonic at the blade tips 74 where the engines 46 are mounted. The rotor can be accelerated to design velocity by utilizing the engines operating under tank pressures. However to avoid under expansion of the rocket nozzles it is preferable to spin up the rotor 36 before igniting the rocket engines 46. Spin up of the rotor 36 can be accomplished with a small electric motor (not shown). An electric motor (not shown) can also be installed between the rotor and the integrated aeroshell 22 to control the vehicle's 20 roll attitude during flight. When the vehicle is resting on the ground this same motor can be driven with ground support power to bring the rotor up to speed.

The engines 46 are initially aligned substantially tangent to the path which the blades 44 sweep out. In the preferred configuration of the launch vehicle 20 the rocket engines 46 and the aerodynamic blades 44 are fixed with respect to each other and are mounted for rotation about the radially extending arms 42 by the bearing 76 as shown on the left side of FIG. 3. The blades 44 are connected up a mechanical link 78 which is driven by an actuator 80 such as a planetary gear train driven by a lightweight pancake motor as shown in FIG. 3.

While the rotor is being brought up to speed the blades 44 are positioned to minimize drag so maximal blade velocity is achieved with power available from the electric motor which is sized for roll control during flight. As soon as the engines are ignited the blades 44 are positioned so the engine nozzles 82 direct gases parallel to the ground 50. This maximize the speed at which the rotor 36 reaches operational velocity. At the same time aerodynamic lift increases as rotor blade velocity increases. When maximal rotor velocity is reached the lift produced by the blades 44 lifts the vehicle off the ground 50. Because during liftoff and rotor spin-up the engines 46 are directed substantially parallel to the ground 50 no debris is kicked up even if the launch surface 50 is only asphalt or a concrete apron. Operational lift-off of the vehicle with the rocket's thrust parallel to the ground eliminates the need for elaborate ground support facilities such as flame buckets and water deluge systems.

Figure 2:
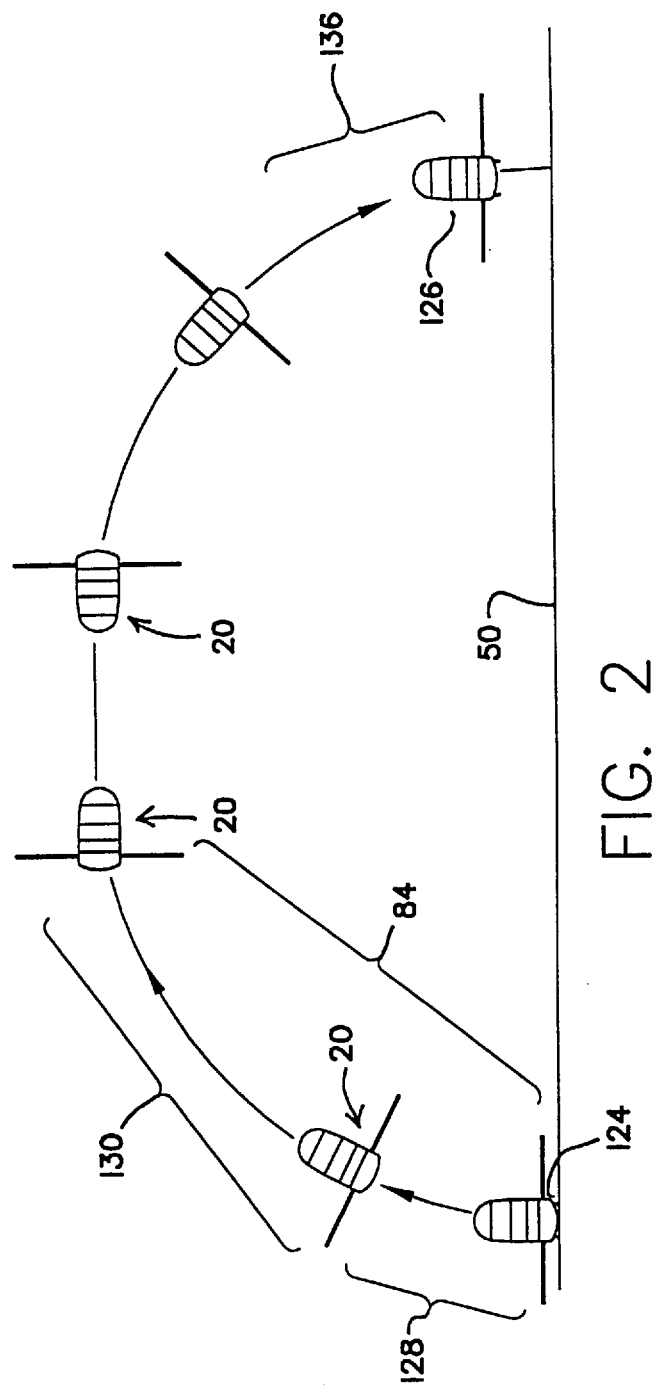
FIG. 2 is a schematic view of the trajectory and operational sequence utilized by the vehicle of FIG. 1.
Figure 6:
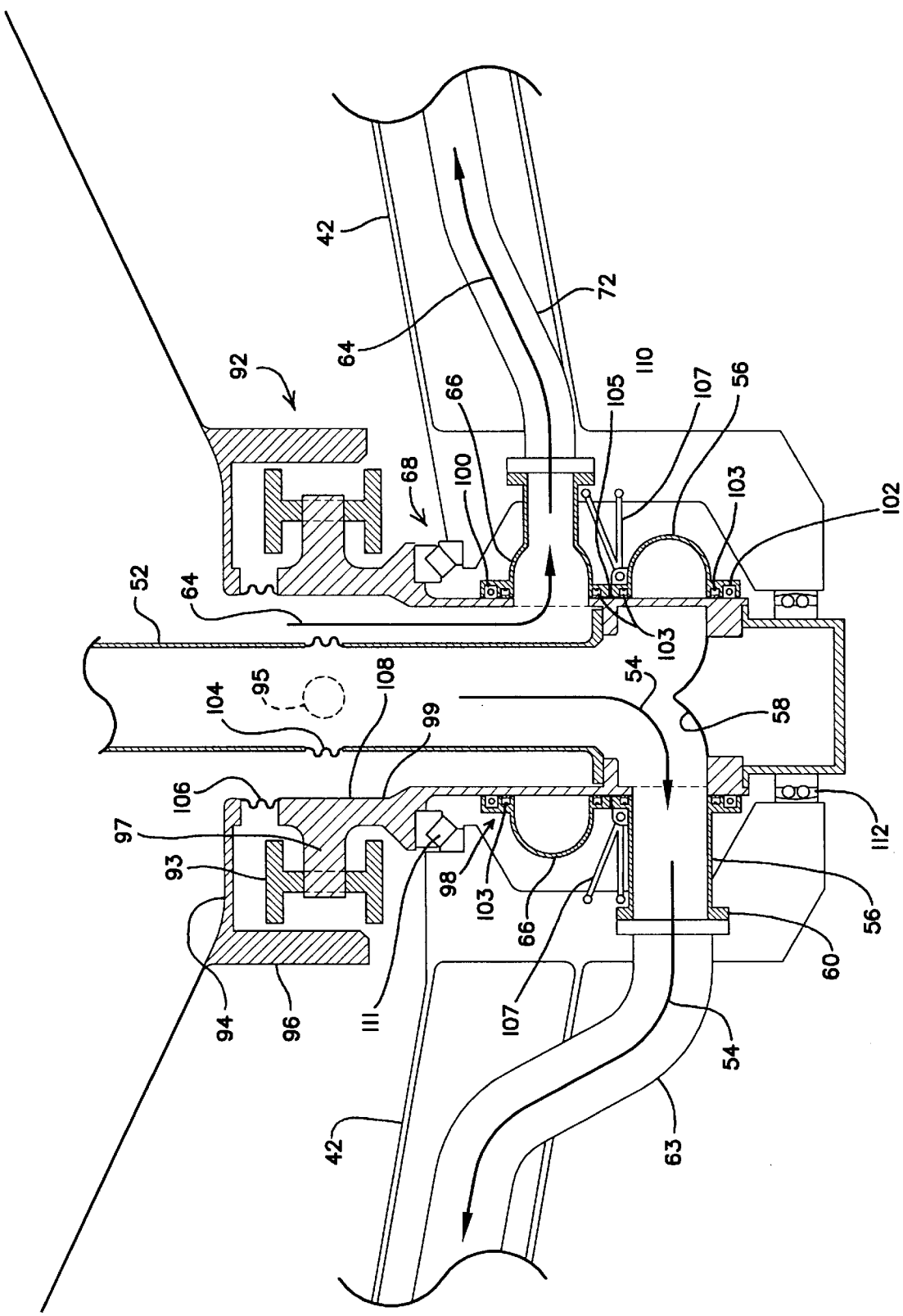
FIG. 6 is a cross-sectional view of an alternative rotor hub mechanism and propellant transfer system.
Figure 9:
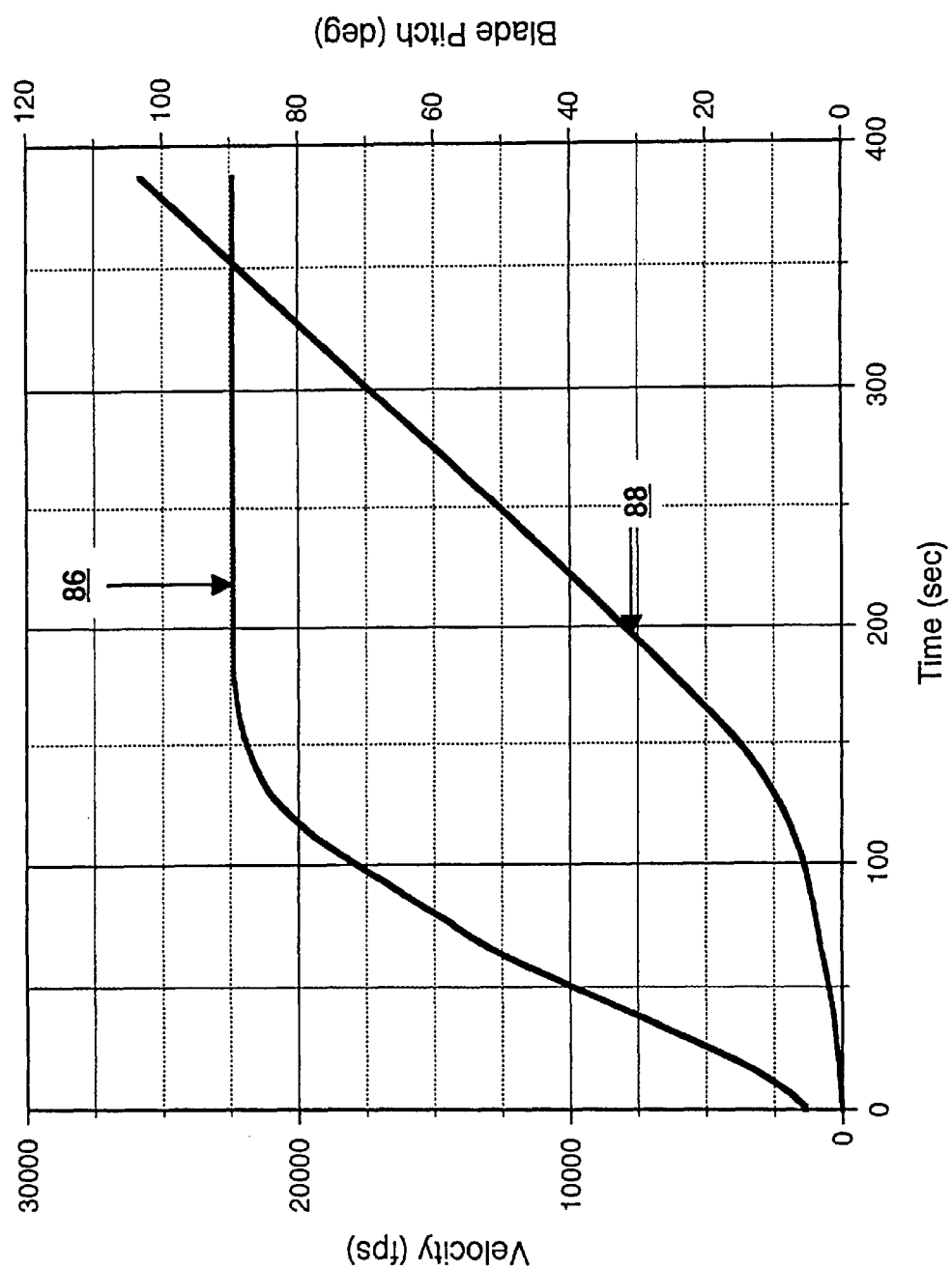
FIG. 9 is a plot of blade angle and vehicle velocity versus time for the launch vehicle of FIG. 1.

Because in the preferred launch vehicle 20 the angles of attack of the blades 44 and the thrust vector of the rocket engines 46 are fixed with respect to each other only one parameter—namely blade angle—needs to be optimized during the powered flight 84 as shown in FIG. 2 . FIG. 9 shows a plot to of blade pitch angle 86, and vehicle velocity 88 versus time. Blade pitch 86 is measured with respect to the vehicle 20 along an axis 90 about which the rotor 36 moves. Blade pitch begins with maximal lift at an angle of about five degrees and rapidly increases so that the rocket engines 46 point along the axis 90 of the rotor 36. Thrust, both aerodynamic from the rotor blades 44 and from the rocket exhaust, is substantially aligned along the axis 90. The vehicle flight path is controlled by gimballing the rotor 36 with respect to the aeroshell 22. The structure of the gimbal 92 is shown in FIG. 6. The gimbal 92 consists of a outer gimbal ring 96 mounted to the bottom 94 of the oxidizer tank 32. A floating inner gimbal 93 is pivotally mounted to the outer gimbal ring 96 by outer pivot pins 95. Inner pivot pins 97 provide pivotally mounting from the floating ring 93 to the gimbal hub 99. The inner pivot pins 97 are positioned ninety degrees from the outer pivot pins 95 thus providing two axes of gimballing motion. Because oxidizer makes up over two thirds of the mass of the vehicle 20 when fully loaded, the structure of FIG. 6 efficiently matches the thrust directly to the load through the outer gimbal ring 96. Connected to the outer gimbal ring 96 by the gimbal 92 is the gimbal hub 99 to which is mounted an outer rotating hub 110 by upper bearings 111 and lower bearing 112. The rotating hub 110 supports the rotor arms 42. Flexible joints 104 for the oxidizer stand pipe 52 and flexible joint 106 in the fuel supply outer wall 108 accommodate flexing due to motion of the gimbal 92.

A propellant feed system 98 consisting of the oxidizer volute 56 an fuel volute 66 is mounted to the gimbal hub 99 by volute top bearings 100 and bottom volute bearing 102. Seals 103 prevent leakage of the propellent. A vent 105 between the oxidizer volute 56 and the fuel prevents mixing of the fuel and oxidizer. If necessary this vent 105 can be purge with inert gas. The propellent feed system 98 is mechanically tied to the rotating hub 110 by a connecting link 107.

Figure 8:
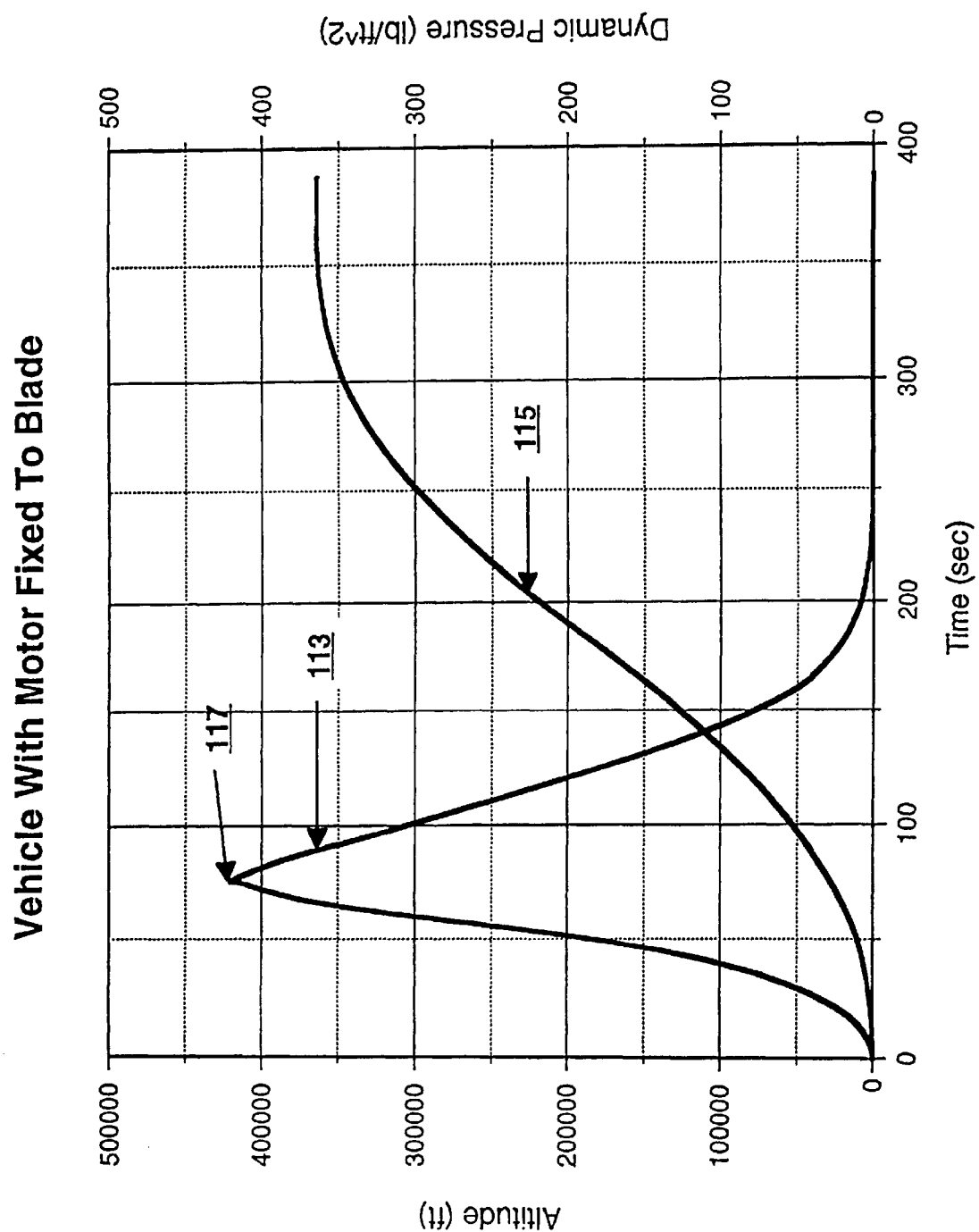
FIG. 8 is a plot of dynamic pressure and vehicle altitude versus time for the launch vehicle of FIG. 1.
Figure 10:
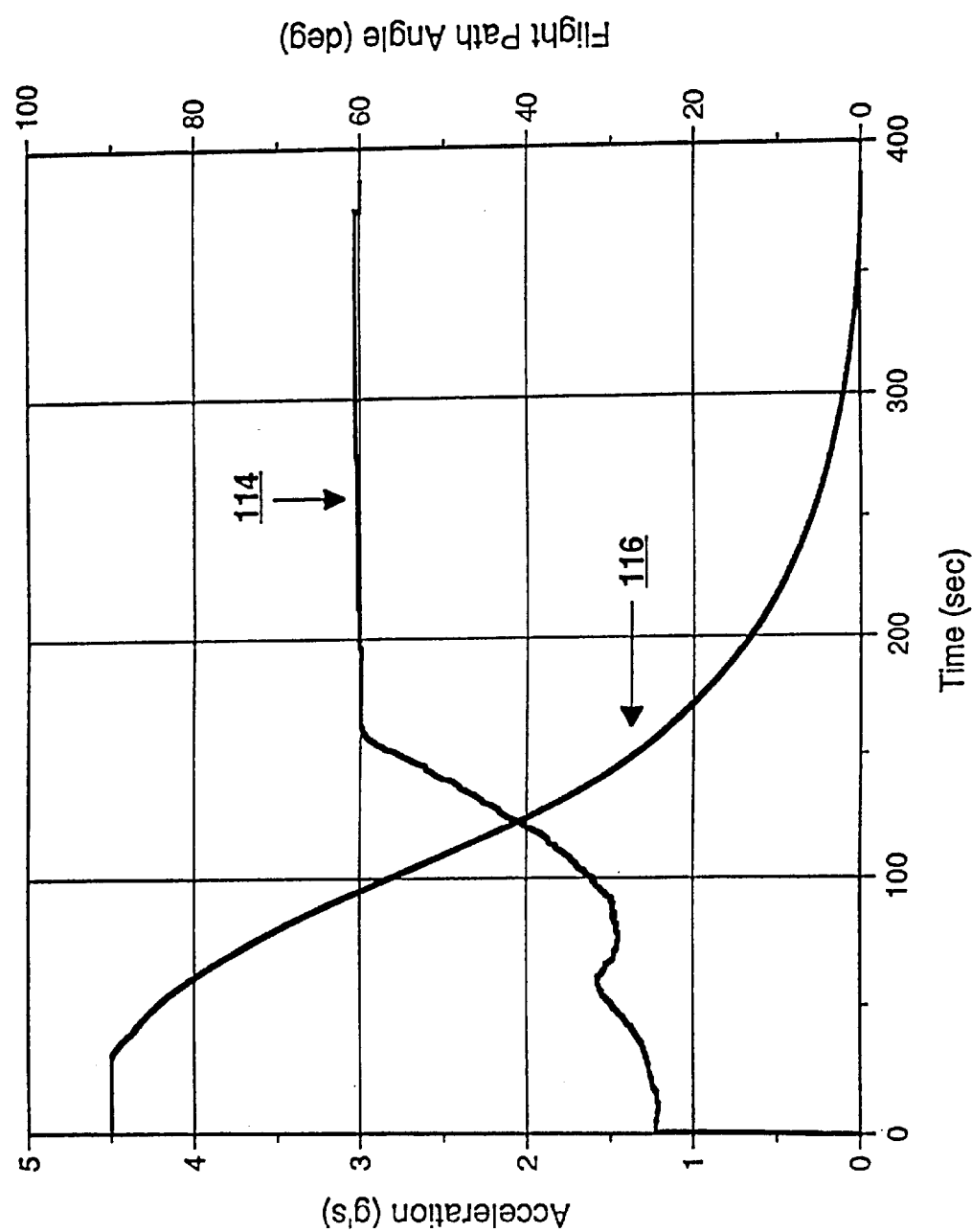
FIG. 10 is a plot of flight path angle and acceleration versus time for the launch vehicle of FIG. 1.
Figure 11:
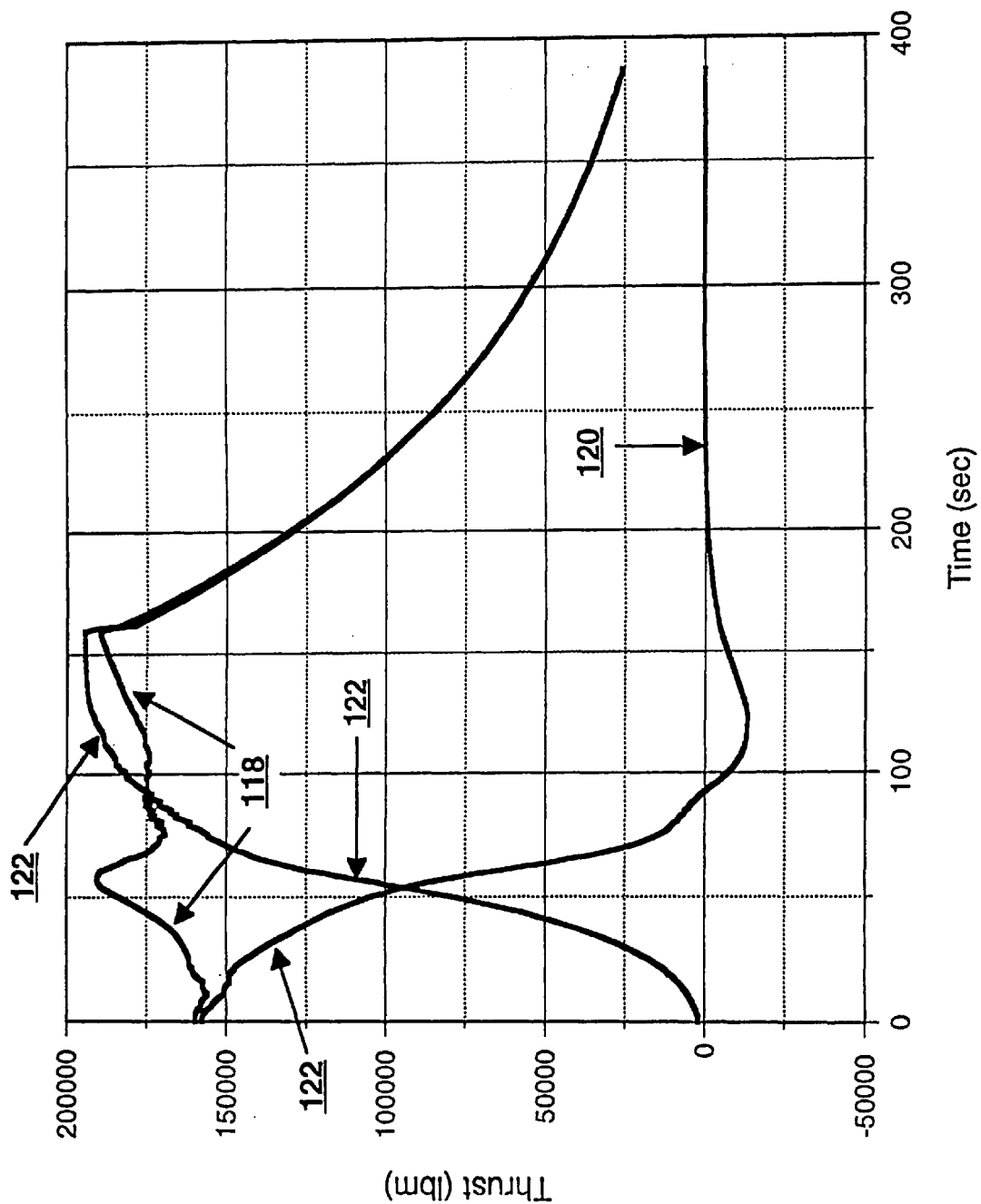
FIG. 11 is a plot of total thrust, rotor thrust and the axial component of rocket thrust for the launch vehicle of FIG. 1.

Referring to FIG. 8 and realizing that dynamic pressure 113 increases rapidly as the vehicle ascends reaching a maximum value 117 of about 420 lbs per foot squared at an altitude 115 of about 20,000 feet at about 75 seconds after liftoff. It can be observed that acceleration 114 in FIG. 9 remains low until after maximum dynamic pressure 117 where the rapid fall-off of dynamic pressure 113 together with the increased blade angle 86 shown in FIG. 9 results in a rapid increase in acceleration 114. FIG. 10 also shows that the flight path angle 116 is vertical for the first forty seconds of flight but rapidly tilts towards horizontal as thrust increases and the vehicle leaves the atmosphere. FIG. 11 shows the contribution to total thrust 118 from the rotor 120 and from the axial component 122 of the rocket engine thrust aligned with rotor axis 90.

Referring to FIG. 11, the rotor is seen to contribute thrust until about ninety seconds into the flight. During the next one hundred seconds of flight the rotor contributes only drag which is substantially less than the thrust contributed during the first ninety seconds of flight. FIG. 2 shows the flight profile of the vehicle 20 from takeoff 124 through landing 126. The atmosphere portion of the trajectory 128 is followed by flight in vacuum 130. The vacuum flight portion 130 of the powered trajectory 84 is characterized by continual throttling of the engines 46 to limit maximum G-loading to 3 G's. When the vehicle reaches orbit the payload 132 is deployed or transferred to an on orbit facility. To return to earth, the vehicle 20 is oriented base 134 first with respect to the direction of flight. The engines 46 are utilized to place the vehicle into an orbit which intersects the earth's atmosphere as shown at 136. The blades 44 are positioned for minimum heating which is at a blade angle of approximate zero.

Heating is minimized by not presenting any sharply curved surfaces to the hypersonic reentry flow. The blades 44 and the base 134 form the heat shield. The blades 44 and the base 134 can be constructed of carbon-carbon and utilize radiation cooling or could utilize water cooling. Direct water cooling where water is boiled by passing it through cooling tubes beneath the blade and base surfaces is possible, however the weight of water necessary for cooling can be reduced by a factor of four or more if the water is used as an abator by releasing the water from the base and the windward side of the blades so the cooling water moves in counterflow to the heat imposed on the vehicle by atmospheric friction.

As the vehicle 20 approaches the ground 50 the blade angle is decreased causing the blades 44 to spin-up and begin generating lift. The gimbal 92 which allowed steering of the vehicle during assent allows the vehicle to be in flown during terminal descent 136. Landing velocity can be minimized by performing a flaring using the blades. During the landing flare, angular momentum of the blade is traded for greater lift which slows the vehicle 20 down just before landing. This landing technique is similar to that used by helicopters when executing a power-out landing.

Figure 12:
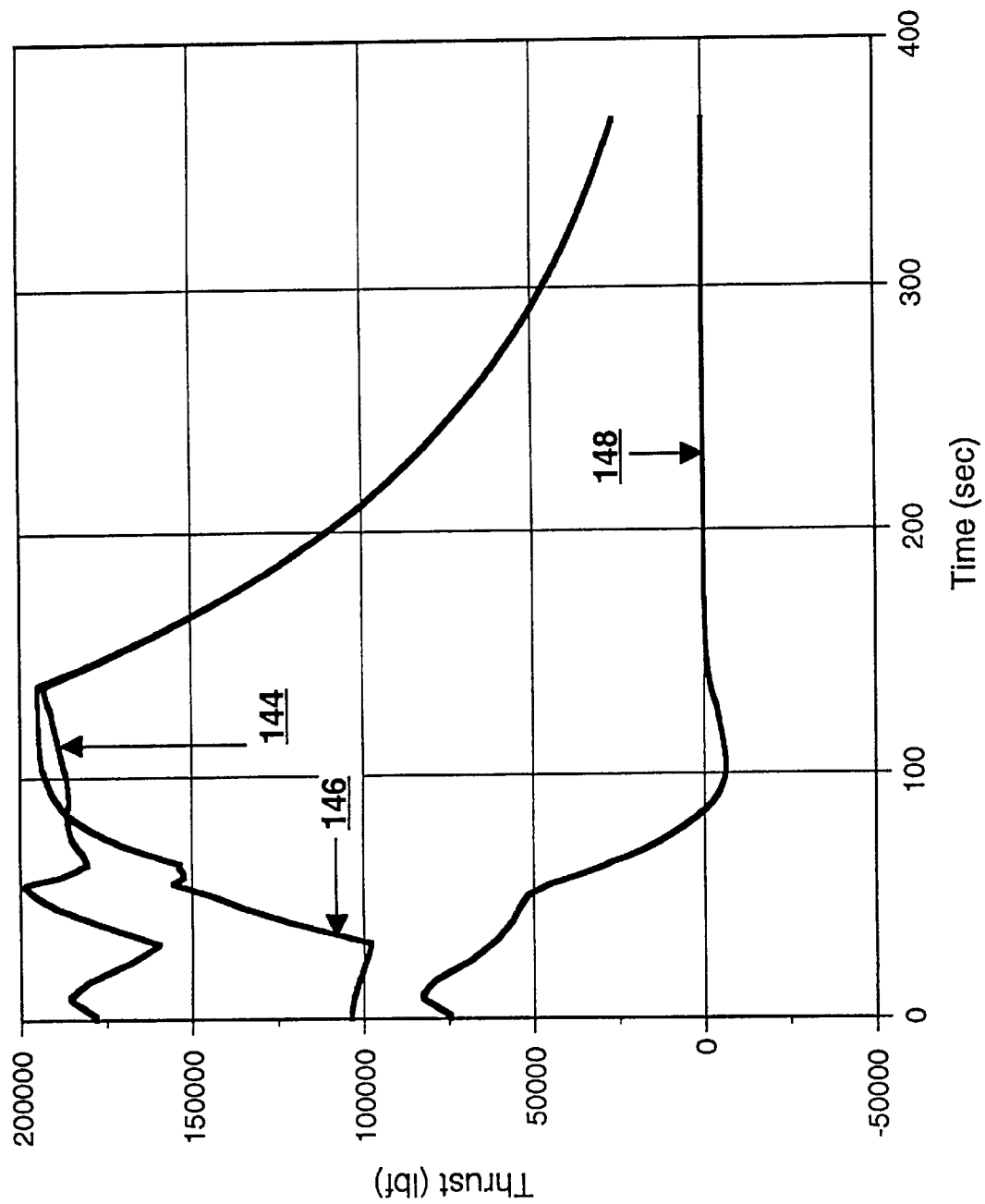
FIG. 12 is a plot of total thrust, rotor thrust and the actual component of rocket thrust for an alternative embodiment of the vehicle of FIG. 1.

An alternative embodiment of the vehicle 20 employs blades 140 shown broken away in FIG. 1. The blades 140 mount a rocket engine 142 which can be gimballed with respect to the blade 140. This allows a vehicle where the rocket engine 142 thrust can be used to provide axially aligned thrust during takeoff. FIG. 12 shows a total thrust time curve 144 and a thrust curve 146 for the axial component of rocket thrust, together with rotor thrust 148. For the vehicle configuration represented by FIG. 12 the rocket engines 142 provide about ½ the total liftoff thrust. This allows the blade 140 area to be reduced in half. Decoupling the rocket engine thrust vector from the blade angle allows better optimization of the trajectory, particularly reducing blade drag after the aerodynamic benefits of the blade become insignificant as the vehicle gains altitude. Because the vehicle configuration illustrated in FIG. 12 has less air augmentation, total injected mass is less than the vehicle 20, however because the blades 140 have reduced area total end weight payload is increased.

Because the propellants increase in pressure as they flow towards the rocket engines 46, 142 any flexible joint in the supply lines 63, 72 which supply propellants to the rocket engine at the blade tips are preferably incorporated into the supple lines 72 near the hub 110. Other ways the thrust vector of the rocket engine 142 can be varied are by gimballing the rocket engine nozzles 146 or by using a deflection nozzle such as used on highly maneuverable jet fighter engines.

Figure 5:
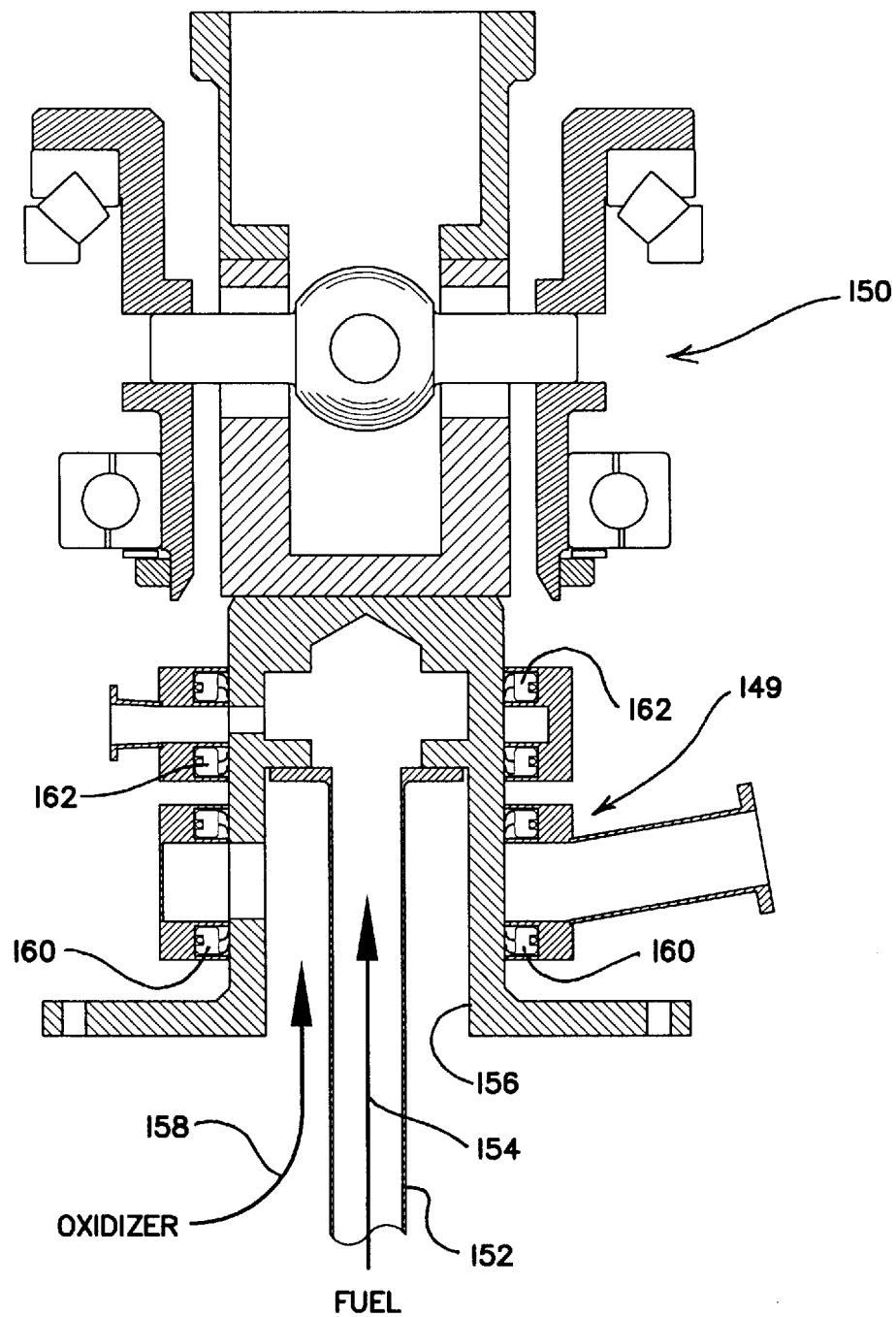
FIG. 5 is a cross-sectional view of a rotor hub mechanism showing the rotor gimbal and propellant transfer system.

FIG. 5 shows an alternative fuel transfer coupling 149 mounted above a gimbal mechanism 150. Fuel is supplied through a standpipe 152 illustrated by arrows 154. Oxidizer is supplied through an annulus 156 as indicated by arrows 158. Sliding seals 160 and 162 pass the propellants through a rotating joint were they can be ducted to rotor arms mounted on the gimbal 150. The arrangement of the gimbal 150 is for a vehicle where the rotor is mounted above the propellant tanks.

Figure 4:
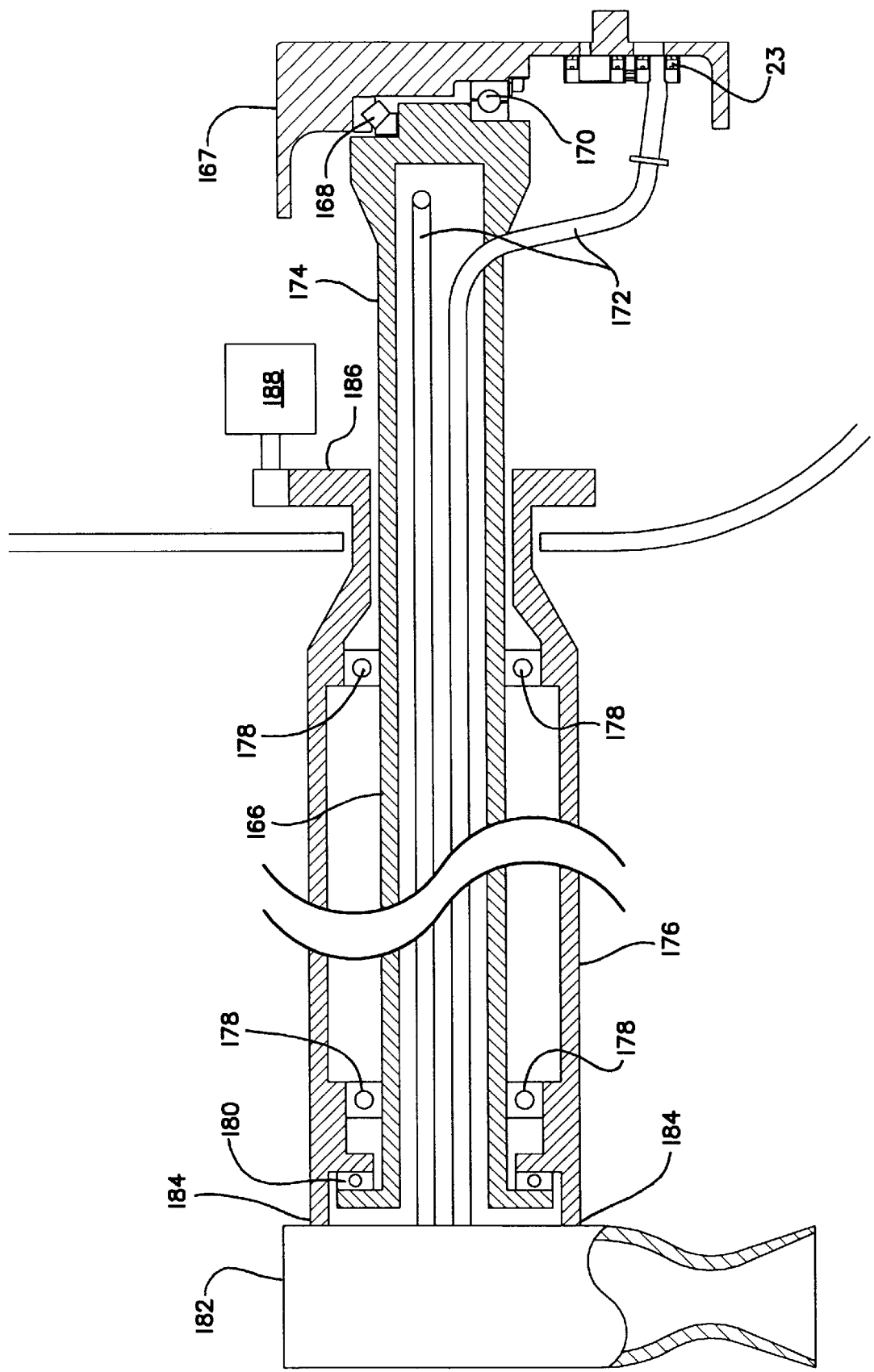
FIG. 4 is a partial cross-sectional view of a rotor blade and mechanism for controlling blade pitch.
Figure 7A:
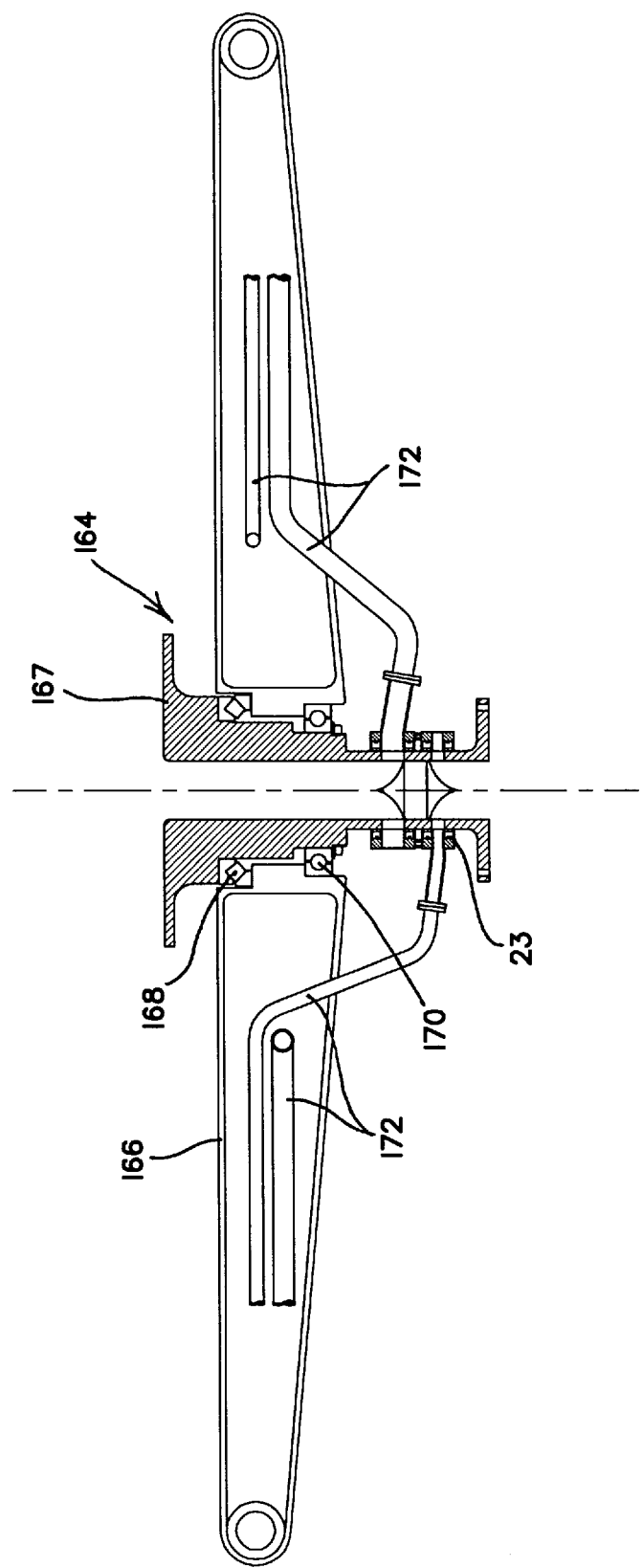
FIG. 7A cross-sectional view of the hub mechanism and propellant transfer system of FIG. 4 wherein the hub is not gimballed.

FIG. 7A is yet another rotor coupling mechanism 164 where the rotor 166 is not gimballed. FIG. 4 shows an enlarged view of the rotor 166 fixedly mounted to a vehicle support structure 167 by an upper thrust bearing 168 and a lower bearing 170. Propellant supply lines 172 proceeds from sliding seals 23 and travel down rotor arms 174. A blade 176 is mounted by rotational bearings 178 and a thrust bearing 180 to the arm 174. A rocket engine 182 is fixedly mounted to the blade end 184. The blade angle and engine thrust vector are controlled by a planetary gear 186 which is driven by a drive motor 188.

Controlling a vehicle employing the fixed rotor 166 of FIG. 4 is accomplished in a way analogous to how a swash plate controls a helicopter. The planetary gear system 186 reacts to a physical plate 190 or a virtual plate (not shown) which causes the gear 186 to cause a momentary deflection of the blade 176 and the engine 182 as the rotor revolves the structure 167. The deflection changes the blade angle and the rocket engine thrust vector while the blade rotates through a narrow section of its path around the vehicle. This causes an unbalance in the thrust which causes the vehicle to change direction or steer.

Figure 7B:
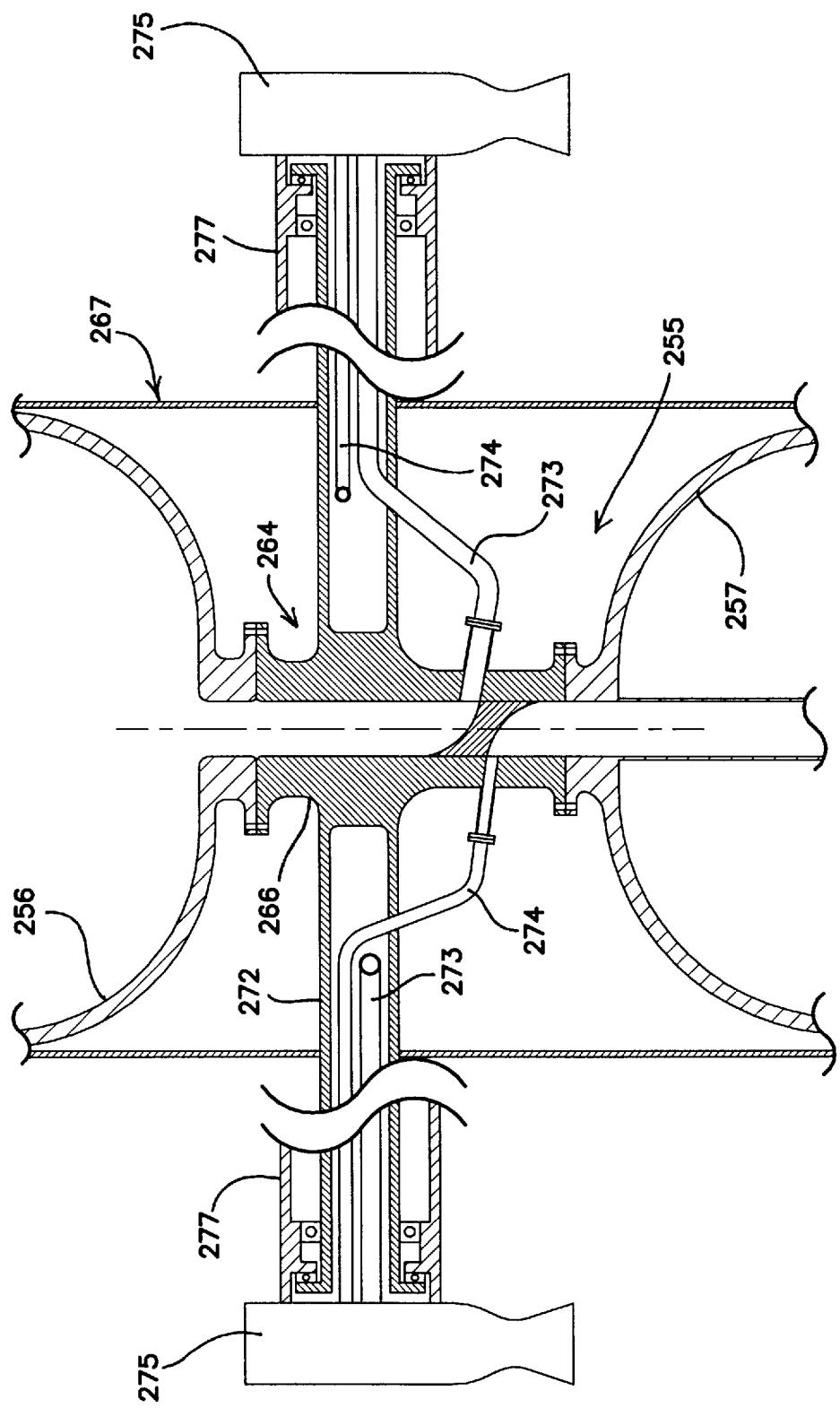
FIG. 7B is a cross-sectional view partly cut away of a alternate launch vehicle were the rotor and vehicle rotate together.

FIG. 7B is still another rotor configuration 255 a mounting mechanism 264 between a oxidizer tank 256 and a fuel tank 257 forms a blade mount 266 to which rotor arms 272 are rigidly connected to a vehicle 267. Propellant is supplied to rocket engines by oxidizer supply lines 273 and fuel lines 274 which proceed down rotor arms 272 to rocket engines 275. Blades 277 mounted on the rotor arms 272 provide aerodynamic lift similar to the vehicle 20 show in FIG. 1.

The configuration of FIG. 7B is similar to the configuration shown in FIG. 4 except the rotor is fixedly mounted to the vehicle so that the vehicle rotates with the rotor. In this configuration the vehicle may initially be mounted on a spin table which rotates the entire vehicle up to takeoff speed where the engines are ignited and propel the vehicle off the spin table. Control of such a vehicle could be through actuation of the blade angle and thrust vector as shown in FIG. 4. The engines could also be independently gimballed as shown in FIGS. 1 and 3. If the vehicle spins during launch and powered flight the payload bay can be de-spun by an electric motor.

It should be understood that vehicles of various configuration employing more than one rotor are possible. More then one rotor may be mounted axially about the body of the vehicle. Two or more rotors may also be mounted on struts extending from the vehicle body.

The vehicle illustrated in FIGS. 1 and 4 has a gross weight in the neighborhood of 130,000 lbs. a vertical dimension of 35 feet, a body diameter of 14 feet, and a rotor diameter of 60 ft. The engines 46 are supplied with propellants at about 4,000 psi with the oxidizer, liquid oxygen being substantially higher due to its high density. The high oxidizer pressure offers the possibility of cooling the engine with the oxidizer. Cavitating ventures may be used in connection with the engines 46 to control pressure to the engine. Throttle control valves alone or in combination with fixed or variable cavitating ventures are used to control thrust both early in the flight when aerodynamic forces are principally used to support the vehicle, and later in flight when G-loads must be limited by throttling the engines. The assumed Isp for a kerosene liquid oxygen vehicle is 340 to 350 seconds.

It should be understood that various cryogenic and non-cryogenic propellants could be used in the vehicle 20.

It should also be understood that for a typical vehicle such as described above a mass ratio of about fifteen is required to achieve orbit. Mass ratio being the ratio between the weight of the vehicle at takeoff and the weight of the vehicle at engine burnout when the vehicle reaches orbital altitude and velocity.

The rotor could be used to modulate the ballistic cross-section of the vehicle which can reduce peak heating and peak deceleration. The rotor may also be used to generate hypersonic lift which can significantly decrease peak heating and peak deceleration and also provide significant crossings.

The launch vehicle 20 presents control issues that are different from those of both helicopters and conventional rocket vehicles. Control of the flight trajectory requires the use of the rotors during atmospheric flight, and use of the rocket engines during space flight, along with combinations of the two during transitional flight regimes.

The following control mechanisms in addition to those described above may be used. Controls with rods, pulleys and cables could be used. On the other hand a complete fly-by-wire systems where remote actuators are operated by electronic commands could be used.

Each of the rotor blade/engine assemblies can be pivoted or rotated around the long axis of the rotor. Performing this action on all rotor blades identically allows the aerodynamic surface of the rotor to modify the lift, or thrust, of the entire rotor assembly during atmospheric flight. This control function is called collective in a helicopter. In the vehicle 20, it also changes the angle of the tip mounted engines to change their angle of thrust from horizontal to nearly vertical.

The engines mounted at the tip of the rotors are capable of being throttled to as low as 20 percent of full thrust. This throttling allows precise balancing of aerodynamic and engine thrust during the entire launch sequence. It is feasible to design such engines to be throttled from the lowest to the highest thrust in as little as 8 milliseconds, or 7,500 times per minute.

The typical conventional rocket, a tall cylinder with engines on the tail, is normally steered by tilting the engine back and forth. This gimballing creates a moment between the line of thrust and the center of gravity of the vehicle that turns the entire vehicle. The vehicle 20 may be steered by increasing the pitch of the blades only in one portion of the rotor disc (this is different from the collective pitch mentioned earlier which changes the pitch of all rotors identically). This operation, called cyclic control, creates a lift vector on one side of the vehicle which changes the flight path of the vehicle 20.

Tilting the plane of the entire rotor with respect to the body of the vehicle 20 is rotor gimballing. The force required to do this can be supplied by actuators within the body of the vehicle.

The engines may provide rapid throttle response that would permit the thrust of a particular engine to be electronically changed while that engine is on one side of the rapidly-spinning rotor disc. This would have the same control effect as the previously-mentioned cyclic approach. This approach could be combined with one of the aerodynamic control techniques in the launch sequence and landing sequence.

Cyclic control requires rapid pitch control of the blades to create differential forces around the rotor disc. During the atmospheric portion of the flight regime some form of spoiler, flap, trim tab, or other small control mechanism mounted on the rotor blade could be used to modify blade lift.

It should be understood that during powered flight the arms 42 of the rotor are deflected into an upwardly opening cone of about ten degrees. This coning of the rotor arms 42 gives stability to the vehicle. Because the arms 42 do deflect, the engines may be oriented to take into account their position when the arms 42 are loaded.

It should be understood that orbits intersecting the earth's surface could be used for ballistic transportation between points on earth.

It is understood that the invention is not limited to the particular construction and arrangement of parts herein illustrated and described, but embraces such modified forms thereof as come within the scope of the following claims.

We claim:

1. A rocket powered vehicle for transporting payload to an earth orbit comprising:

a vehicle body, the vehicle body including an oxidizer tank and a fuel tank;

a rotor having at least two arms extending from a central hub, the hub being mounted to the vehicle body for rotation, rotation of the arms defining a direction of motion, the hub rotation defining an axis about which the hub rotates;

at least one rocket engine mounted on each arm, the engines being mounted to the blades so the engines may be oriented to provide substantial thrust parallel to the axis about which the hub rotates and simultaneously provide a component of thrust tangent to the direction of motion of the blades, the component of thrust causing the blades to rotate about the hub;

an oxidizer fluid coupling means for providing oxidizer from the oxidizer tank through the hub to the rocket engines;

a fuel fluid coupling means for providing fuel from the fuel tank to the hub to the rocket engines; and wherein the hub is mounted by a gimbal to the vehicle body, the gimbal providing two substantial orthogonal gimbal axes which are substantially normal to the axis of rotation so the path of the vehicle through space can be controlled by rotating the rotor and hub about the gimbal.

2. The vehicle of claim 1 wherein the engines are mounted to aerodynamic blades which are mounted to the rotor arms, the engines and the aerodynamic blades being mounted for continuous angular rotation between a position substantially in a plane defined by the motion of the rotor and a position substantially aligned with the axis of the rotor.

3. The vehicle of claim 2 wherein the blades have free ends opposite the hub and wherein the engines are mounted at the blade free ends.

4. The vehicle of claim 1 wherein a ratio between a vehicle weight when the oxidizer and propellant tanks are empty and a vehicle weight when the tanks are substantially full is between about 14 to about 16 so the vehicle can obtain orbit with a single stage.

5. The vehicle of claim 1 wherein the vehicle has an empty weight of between 3,000 lbs. and 15,000 lbs.

6. The vehicle of claim 1 wherein the vehicle body has a volume of revolution shape with an axis defined by the volume wherein the body is substantially longer along the axis than perpendicular to the axis and wherein the hub is mounted so the axis of rotation of the hub is substantially aligned with the axis of the body.

7. The vehicle of claim 6 wherein the body has a front which faces the direction of motion of the vehicle and a back opposite the front, and wherein the hub is mounted to the vehicle at substantially the back.

8. The vehicle of claim 1 wherein the hub has four arms with at least one engine mounted on each arm.

9. A rocket powered vehicle for transporting a payload along a path in space comprising:

a vehicle body, the vehicle body including an oxidizer tank and a fuel tank;

a rotor having least two aerodynamic blades extending from the vehicle body, the body defining an axis of symmetry about which the vehicle rotates, the aerodynamic blades rotating with the vehicle body, wherein the blades extend along radial lines extending from the axis of symmetry;

at least one rocket engine mounted on each blade, the rocket engines being mounted at substantially equal distances from the axis of symmetry, the engines being mounted to the blades so the engines may be oriented to provide substantial thrust along the axis and simultaneously provide a component of thrust tangent to the direction of motion of the blades, the component of thrust causing the blades and vehicle body to rotate;

an oxidized fluid conduit from the oxidizer tank to the rocket engines; and a fuel fluid conduit from the fuel tank to the rocket engines.

10. The vehicle of claim 9 wherein the rotor is gimballed to the vehicle body, the gimbal providing two substantially orthogonal gimbal axes which are substantially normal to the axis of symmetry so the path of the vehicle through space can be controlled by rotating the rotor about the gimbal axes.

11. The vehicle of claim 9 wherein the aerodynamic blades are rotatively mounted to the rotor to rotate about the radial lines and a means for controlling rotation of the blades so as to control the path of the vehicle.

12. The vehicle of claim 9 wherein the rocket engines are rotatively mounted to rotate above the radial line and a means for controlling rotation of the engines about the radial lines to control the path of the vehicle.

13. A rocket powered vehicle for transporting a payload along a path in space comprising;

a vehicle body, the vehicle body including an oxidizer tank and a fuel tank;

a rotor having at least two arms extending from a central hub, the hub being mounted to the vehicle body for rotation, rotation of the arms defining a direction of motion and an arm path, the hub rotation defining an axis about which the arms rotate;

at least one rocket engine mounted on each arm, the engines being mounted to the arms so the engines may be oriented to provide substantial thrust parallel to the axis about which the hub rotates and simultaneously provide a component of thrust tangent to the direction of motion of the blades, the component of thrust causing the blades to rotate about the hub;

an oxidizer fluid coupling means for providing oxidizer from the oxidizer tank through the hub to the rocket engines;

a fuel fluid coupling means for providing fuel from the fuel tank to the hub to the rocket engines;

a means for controlling attitude of the vehicle by varying the component of thrust aligned parallel to the axis ever a portion of the arm path as it rotates about the vehicle, thus producing unbalanced thrust which steers the vehicle.

14. The vehicle of claim 13 wherein aerodynamic blades are mounted to the rotor arms to provide aerodynamic lift during the vehicle's flight through the atmosphere.

15. The vehicle of claim 14 wherein the engine and the blades are rigidly connected, and wherein rotating the aerodynamic blades and the engines about a radial line perpendicular to the axis forms the means for controlling attitude.

* * * * *